(12) United States Patent
Chakraborty et al.

(10) Patent No.: US 10,116,484 B1
(45) Date of Patent: Oct. 30, 2018

(54) TECHNIQUES AND APPARATUSES FOR ODD-EXPONENT QUADRATURE AMPLITUDE MODULATION

(71) Applicant: QUALCOMM Incorporated, San Diego, CA (US)

(72) Inventors: Tuhin Subhra Chakraborty, Bangalore (IN); Ashutosh Deepak Gore, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/656,580

(22) Filed: Jul. 21, 2017

(51) Int. Cl.
*H04L 27/34* (2006.01)
*H04L 27/36* (2006.01)

(52) U.S. Cl.
CPC .......... *H04L 27/3483* (2013.01); *H04L 27/36* (2013.01)

(58) Field of Classification Search
CPC ............... H04L 1/0057; H04L 27/2601; H04L 27/2627; H04L 1/0061; H04L 1/0042; H04L 27/2637; H04L 27/36; H04N 21/2383; H04B 7/0456; H03M 13/2906; G06F 11/10
See application file for complete search history.

(56) References Cited

U.S. PATENT DOCUMENTS

| | | | |
|---|---|---|---|
| 9,667,459 B1 * | 5/2017 | Naim | H04L 27/2602 |
| 2008/0192851 A1 * | 8/2008 | Golitschek Edler Elbwart | H04L 27/34 375/261 |
| 2009/0003466 A1 * | 1/2009 | Taherzadehboroujeni | H04B 7/0669 375/260 |
| 2015/0128004 A1 * | 5/2015 | Lee | H03M 13/25 714/746 |
| 2016/0337081 A1 | 11/2016 | Jung et al. | |
| 2018/0069614 A1 * | 3/2018 | Taherzadehboroujeni | H04B 7/0413 |

FOREIGN PATENT DOCUMENTS

JP 2015162752 A 9/2015

OTHER PUBLICATIONS

Naeem M., et al., "Performance Analysis of Odd Bit QAM Constellation", IEEE International Conference Symposium on Emerging Technologies, 2005, pp. 178-181.
Park S-J., et al., "Odd-Bit Triangular Quadrature Amplitude Modulations", IEEE 20th International Symposium on Personal, Indoor and Mobile Radio Communications, 2009, pp. 2419-2423.

(Continued)

*Primary Examiner* — Khanh C Tran
(74) *Attorney, Agent, or Firm* — Harrity & Harrity, LLP

(57) ABSTRACT

Certain aspects of the present disclosure generally relate to wireless communication. In some aspects, a wireless communication device may identify groups of bits of a particular size; map the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and transmit a signal based at least in part on the odd-exponent modulation constellation. Numerous other aspects are provided.

30 Claims, 13 Drawing Sheets

(56) References Cited

OTHER PUBLICATIONS

Hua S., et al., "Five Decades of Hierarchical Modulation and its Benefits in Relay-Aided Networking," IEEE Access, vol. 3, Jan. 5, 2016, pp. 2891-2921, XP011592105, retrieved on Jan. 5, 2016.
Interdigital Communications: "On Fractional N-ary Modulation for NR," 3GPP Draft; R1-1612659 on Fractional N-ary Modulation for NR, 3rd Generation Partnership Project (3GPP), Mobile Competence Centre; 650, Route Des Lucioles; F-06921 Sophia-Antipolis Cedex; France, vol. Ran WG1, No. Reno, USA; Nov. 14-Nov. 18, 2016, Nov. 13, 2016, XP051176602, 8 pages, Retrieved from the Internet: URL: http://www.3gpp.org/ftp/Meetings_3GPP_SYNC/RAN1/Docs/ [retrieved on Nov. 13, 2016].
International Search Report and Written Opinion—PCT/US2018/033651—ISA/EPO—datd Aug. 13, 2018.

\* cited by examiner

TECHNIQUES AND APPARATUSES FOR ODD-EXPONENT QUADRATURE AMPLITUDE MODULATION

FIELD OF THE DISCLOSURE

Aspects of the present disclosure generally relate to wireless communication, and more particularly to techniques and apparatuses for odd-exponent (OE) quadrature amplitude modulation (QAM).

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include identifying groups of bits of a particular size; mapping the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and/or transmitting a signal based at least in part on the odd-exponent modulation constellation.

In some aspects, a wireless communication device may include a memory and one or more processors operatively coupled to the memory. The one or more processors may be configured to identify groups of bits of a particular size; map the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and/or transmit a signal based at least in part on the odd-exponent modulation constellation.

In some aspects, a non-transitory computer-readable medium storing computer executable code for wireless communication, comprising code for identifying groups of bits of a particular size; mapping the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and/or transmitting a signal based at least in part on the odd-exponent modulation constellation.

In some aspects, an apparatus for wireless communication may include means for identifying groups of bits of a particular size; means for mapping the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and/or means for transmitting a signal based at least in part on the odd-exponent modulation constellation.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
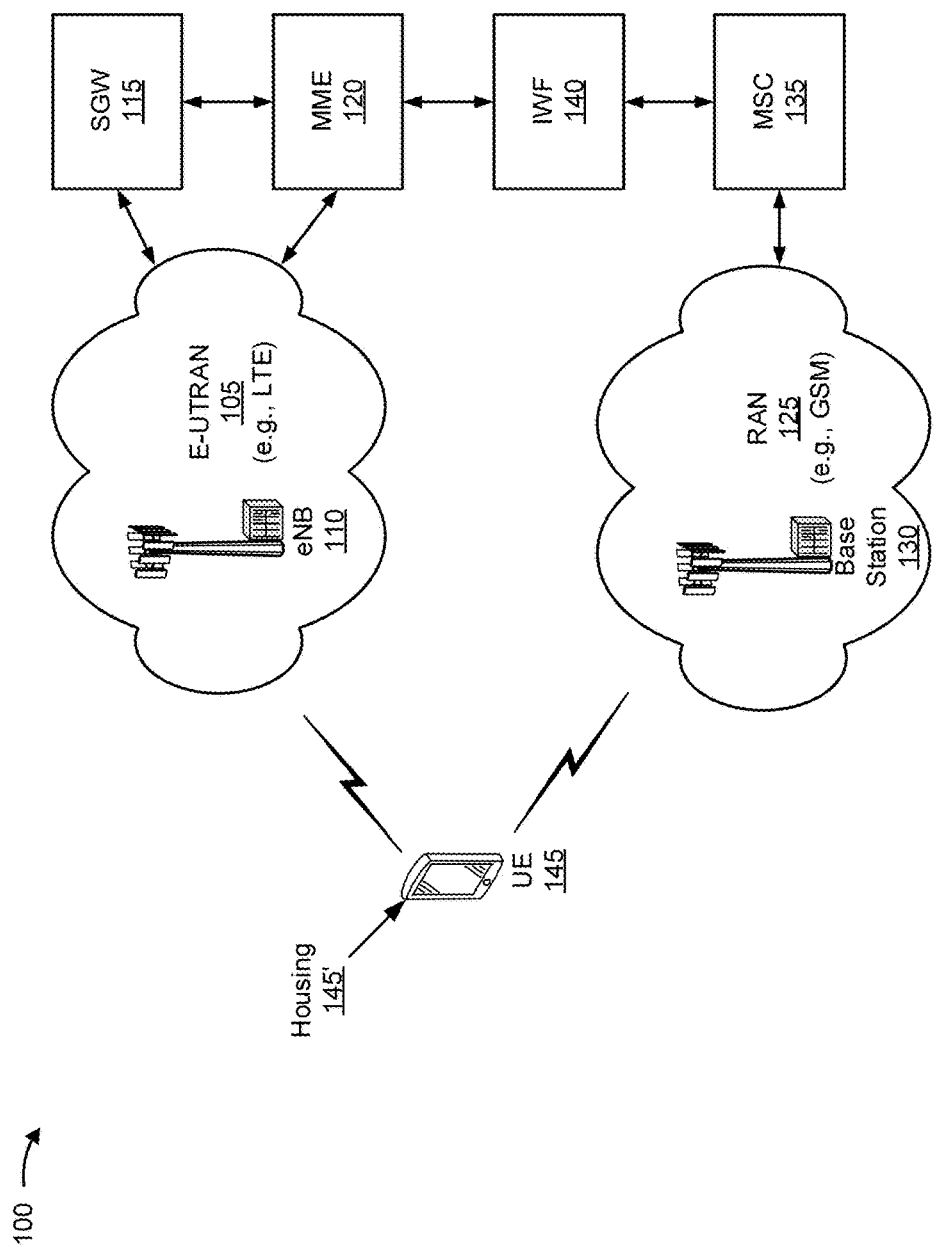
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
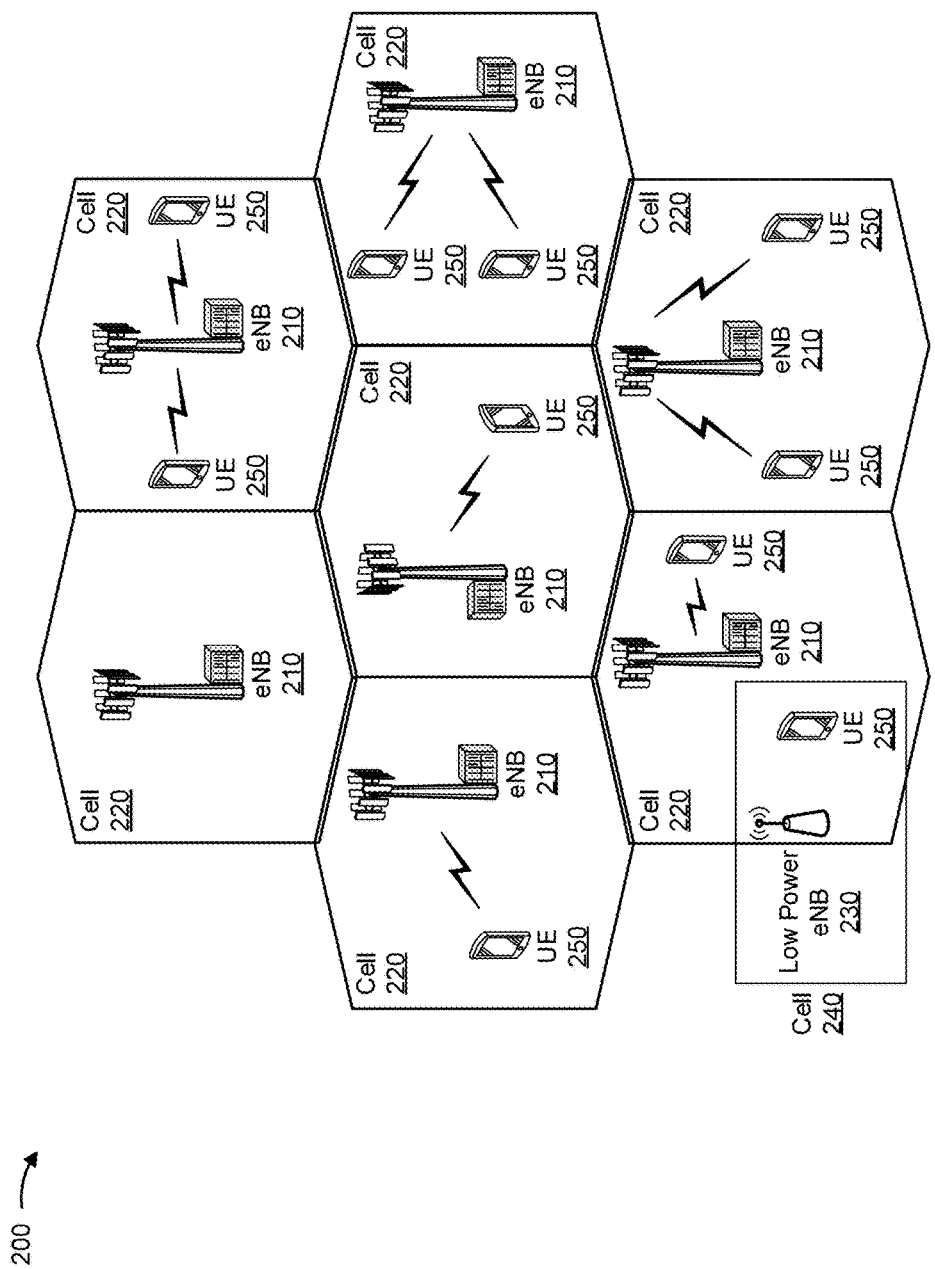
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, orthogonal frequency division multiplexing (OFDM) is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a discrete Fourier Transform (DFT)-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
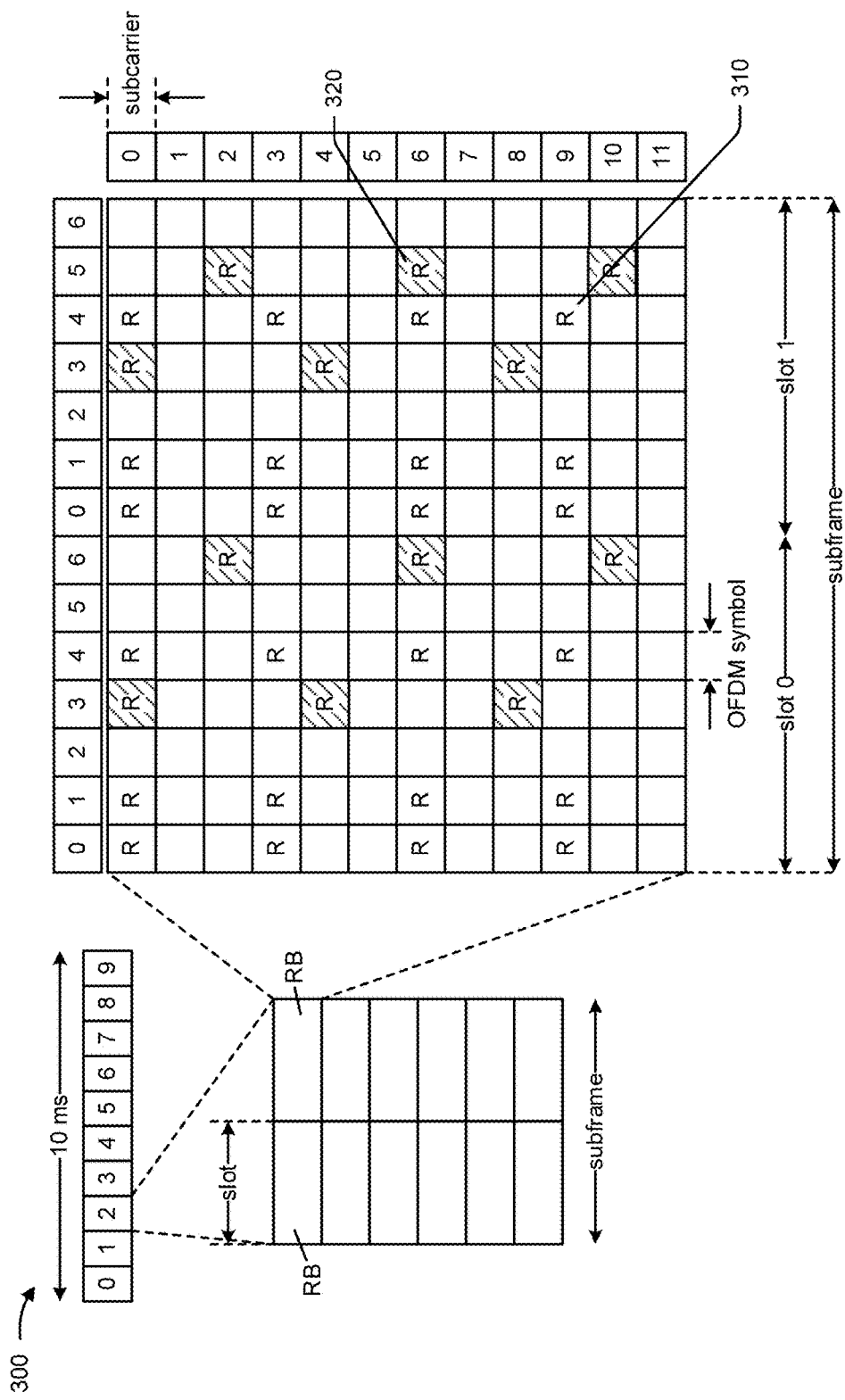
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical Hybrid Automatic Repeat Request (HARQ) Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
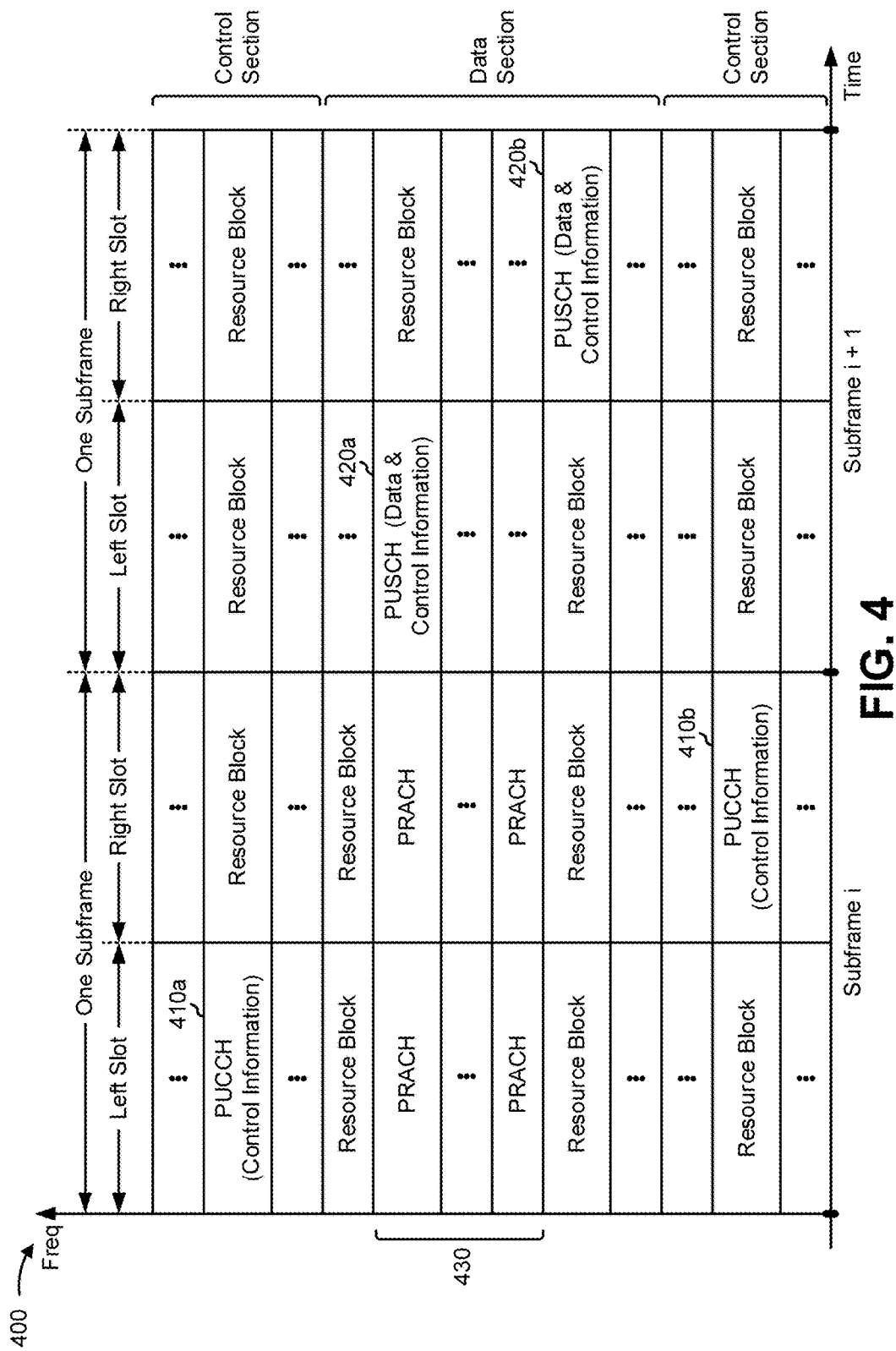
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
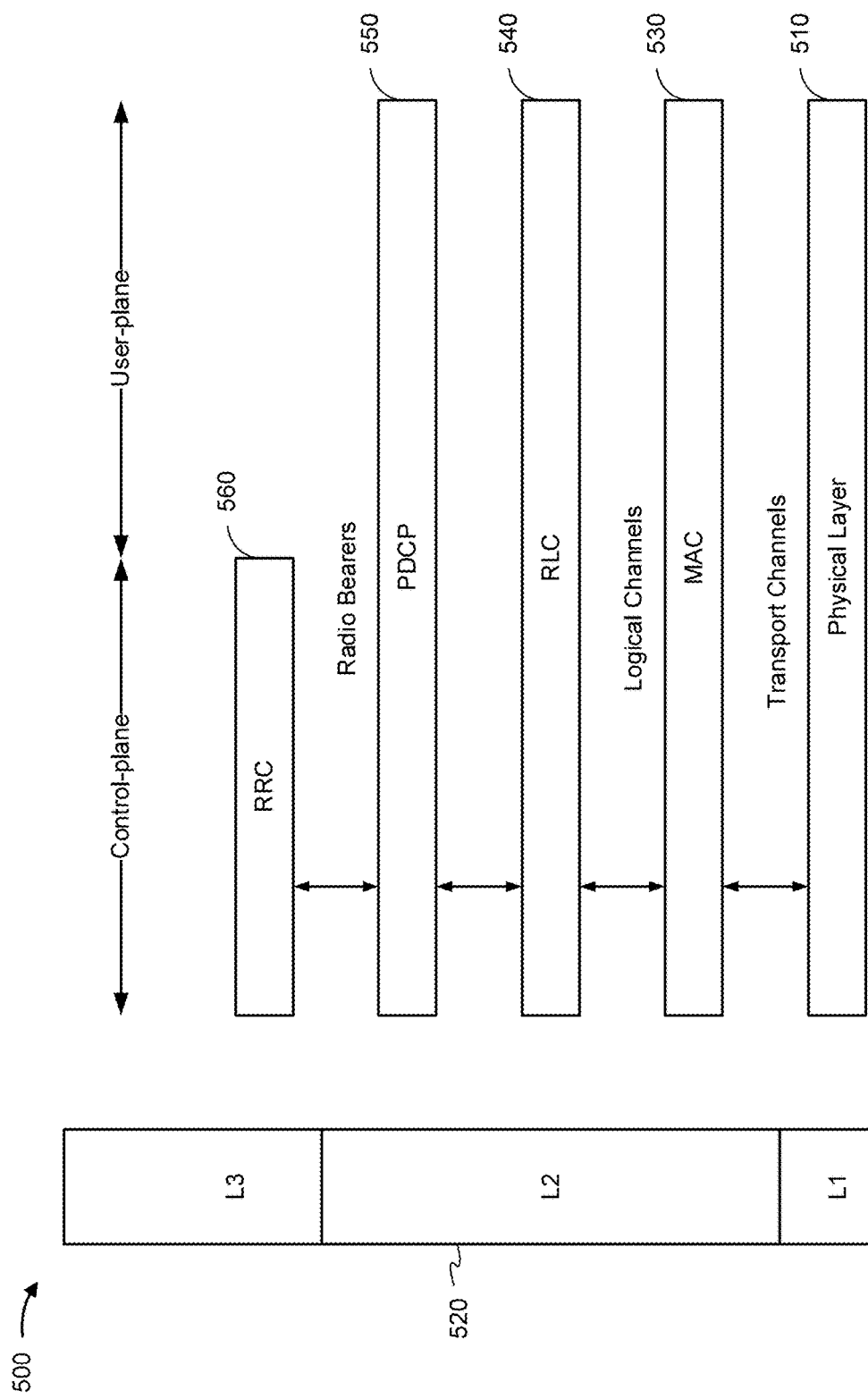
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., Internet Protocol (IP) layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
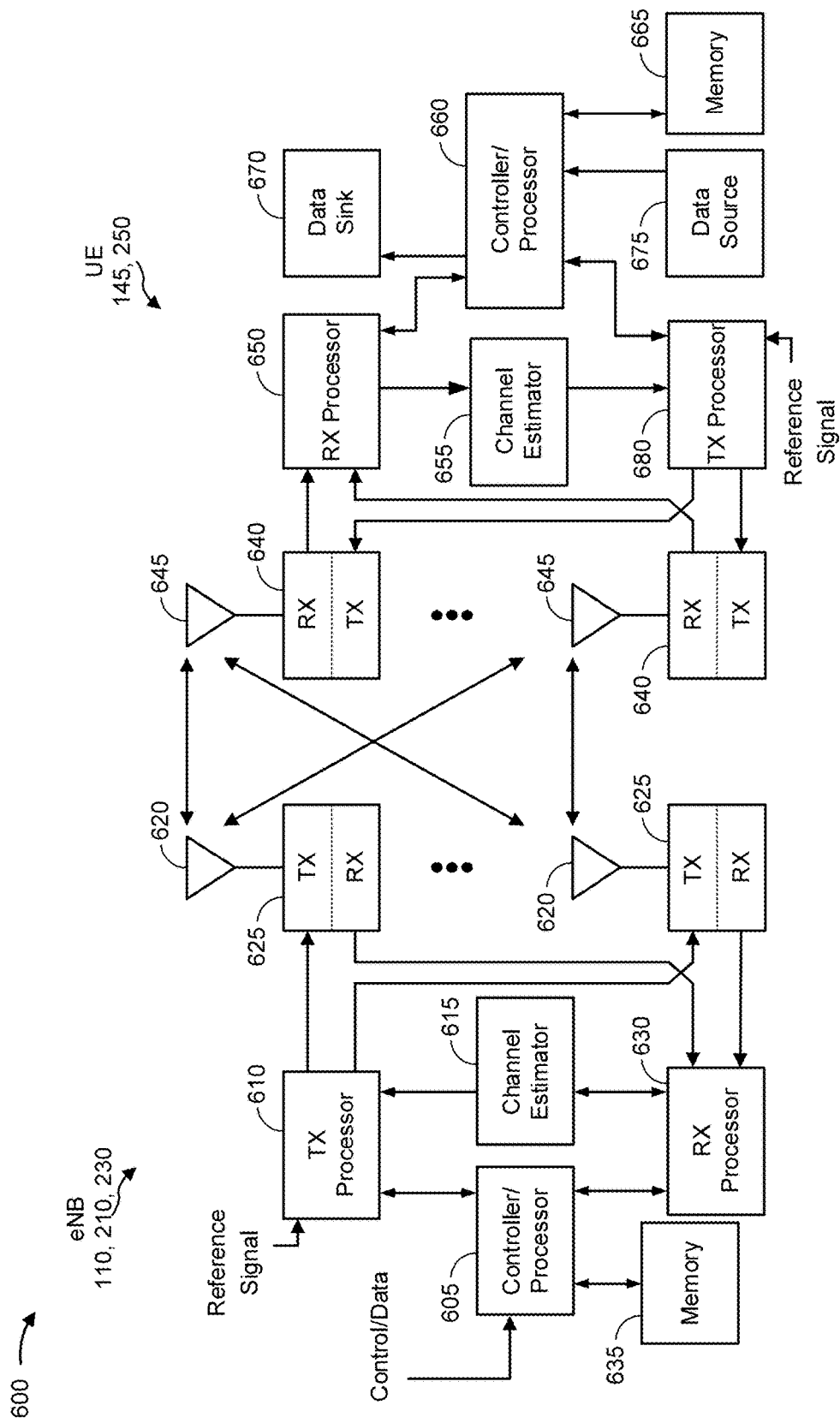
FIG. 6 is a diagram illustrating example components of an evolved Node B and a user equipment in an access network, in accordance with various aspects of the present disclosure.

FIG. 6 is a diagram illustrating example components 600 of a base station such as an eNB 110, 210, 230 and a UE 145, 250 in an access network, in accordance with various aspects of the present disclosure. As shown in FIG. 6, eNB 110, 210, 230 may include a controller/processor 605, a transmit (TX) processor 610, a channel estimator 615, an antenna 620, a transmitter 625TX, a receiver 625RX, a receive (RX) processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates a radio frequency (RF) carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antennas 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1. In some aspects, one or more of the components shown in FIG. 6 may be employed to perform example process 1000 and/or other processes for the techniques described herein. One or more components of eNB 110, 210, 230 may be configured to perform odd exponent QAM, as described in more detail elsewhere herein. For example, the controller/processor 605 and/or other processors and modules of eNB 110, 210, 230 may perform or direct operations of, for example, process 1000 of FIG. 10 and/or other processes as described herein. Additionally, or alternatively, one or more components of UE 145, 250 may be configured to perform odd exponent QAM, as described in more detail elsewhere herein. For example, the controller/processor 660 and/or other processors and modules of UE 145, 250 may perform or direct operations of, for example, process 1000 of FIG. 10 and/or other processes as described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

A wireless communication device (e.g., a UE 145, 250, an eNB 110, 210, 230, and/or the like) may communicate using a radio signal that carries information. The information is modulated onto a carrier signal to create the radio signal. A receiver of the radio signal may know which modulation approach is used to create the radio signal, and may demodulate the radio signal based at least in part on the modulation approach to identify the information.

In cellular networks, such as LTE, radio signals may be modulated according to a quadrature amplitude modulation (QAM) approach. QAM conveys two signals by modulating the amplitudes and phases of two carrier waves that are out of phase with each other by 90 degrees. The modulation may be used for a set of bits that are to be transmitted to a receiver.

QAM may be performed using a particular exponent that identifies how many possible values can be modulated onto a signal. The particular exponent may include 2 for 4 possible values (for 4-QAM or QPSK), 4 for 16 possible values (for 16-QAM), 6 for 64 possible values (for 64-QAM), and so on. In other words, the quantity of possible values for an exponent x is equal to $2^x$. Odd exponents can also be used for QAM, but have traditionally been associated with certain difficulties, as explained below. Higher QAM approaches convey more information on a signal in a given amount of time, but require better signal to noise ratio (SNR) than lower QAM approaches. Thus, as a receiver moves further from a source, the source may use increasingly lower QAM approaches so that the receiver can continue to successfully demodulate the signal at the cost of a lower data throughput. For example, each QAM may be associated with a respective radius from the source, where each QAM is a feasible modulation approach, as described in connection with FIG. 9, below.

A QAM approach (e.g., 4-QAM, 8-QAM, 16-QAM, 32-QAM, 64-QAM, and so on) may be represented by a constellation of possible values that can be encoded using the QAM approach. A horizontal axis of a visual representation of such a constellation (e.g., as described in connection with reference number 730 of FIG. 7B, below) may correspond to an amplitude of an in-phase wave (I), and a vertical axis may correspond to an amplitude of a quadrature wave (Q). A receiver may receive a signal with a particular I amplitude/phase and a particular Q amplitude/phase. To decode the signal, the receiver may map I and Q to the constellation, and may identify a closest dot. The identified dot corresponds to a particular symbol or bit sequence. Thus, a modulated signal is demodulated using the maximum likelihood approach. The received signal is unlikely to exactly map to a constellation dot, so a closest dot may be used. A demodulation error occurs when the received signal maps to the wrong dot due to noise, interference, phase shift, and/or the like. As a result, dots that are farther apart will yield more accurate demodulation.

Constellations may have various shapes. For example, the constellation identified above is rectangular (or square), which is convenient from a hardware perspective for demodulation by the receiver. However, the constellation identified above, with the arrangement of dots described above, only works for even-exponent QAM approaches. This means that the gap between respective radii from the source (shown in FIG. 9), for different QAM approaches, must be wide enough to switch from one even-exponent QAM approach to the next even-exponent QAM approach (e.g., from 4-QAM to 16-QAM, bypassing 8-QAM), which reduces performance that could be improved by use of 8-QAM. Odd-exponent QAM approaches can be represented using circular constellations, but these are difficult to implement in hardware.

Techniques and apparatuses, described herein, enable symmetric odd-exponent QAM using a square constellation of dots that are spaced more widely than in a square constellation for even-exponent QAM. The odd-exponent QAM constellation may be created from a next-higher even-exponent QAM constellation, as described in connection with FIG. 7A, below. As described in more detail in connection with FIG. 7B, dots for the odd-exponent QAM constellations are spaced more widely than dots for the corresponding even-exponent QAM constellations. Thus, demodulation accuracy is improved. Further, by using both odd-exponent QAM and even-exponent QAM, rate adaptation (e.g., QAM approach selection) at different distances may be improved, which improves system throughput and demodulation accuracy, as described in more detail in connection with FIG. 9, below.

Figure 7A:
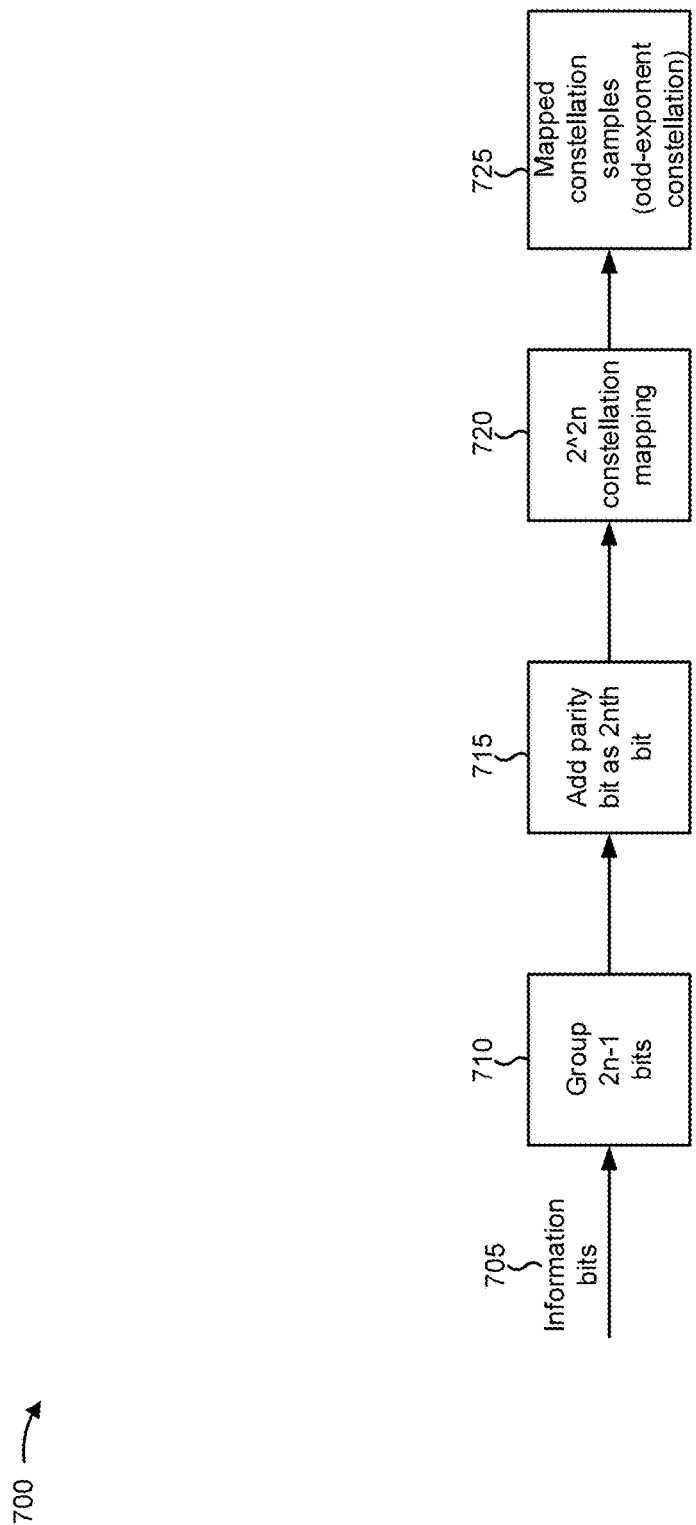
FIGS. 7A and 7B are diagrams illustrating examples of generating an odd-exponent modulation constellation, in accordance with various aspects of the present disclosure.
Figure 7B:
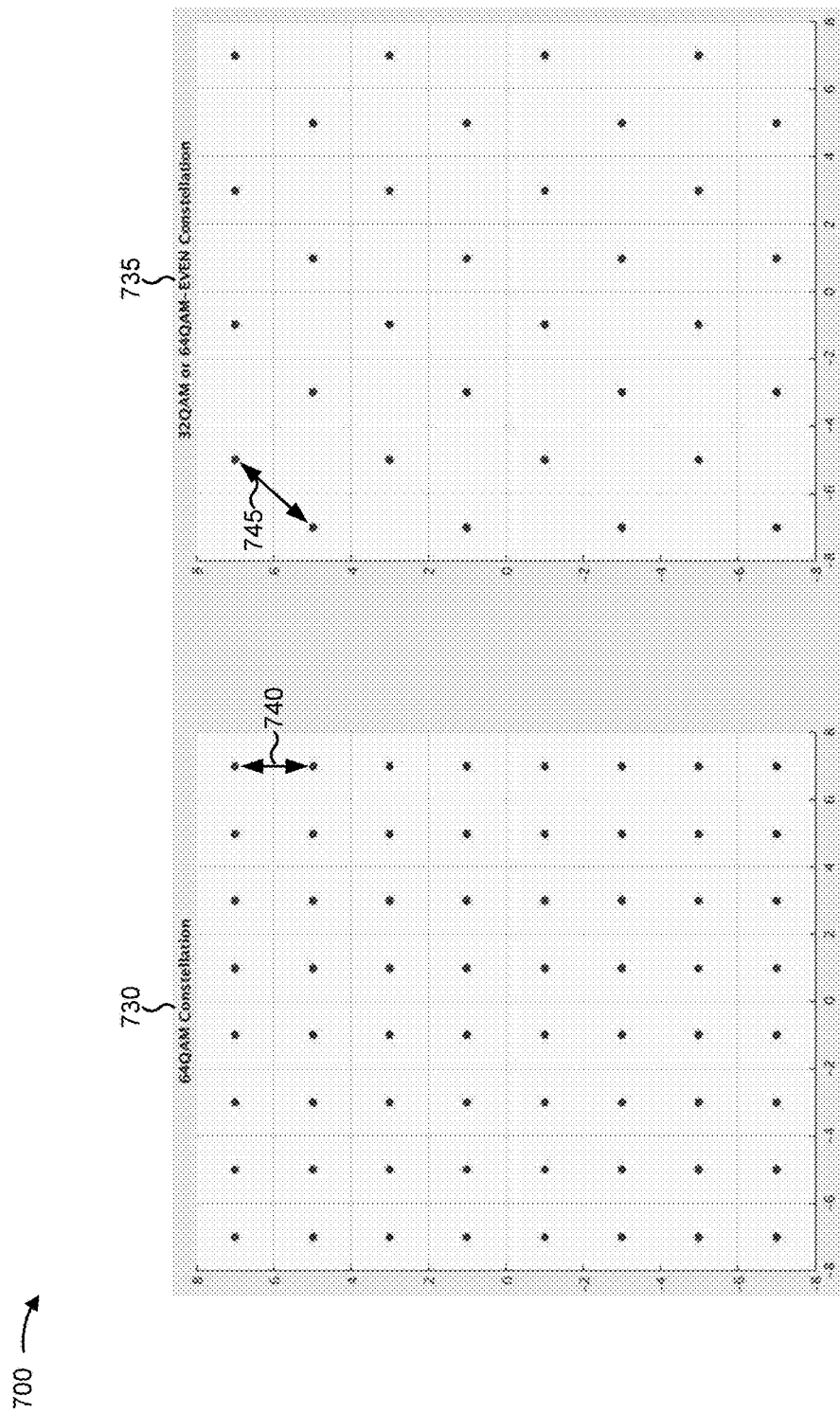

FIGS. 7A and 7B are diagrams illustrating examples 700 of generating an odd-exponent modulation constellation, in accordance with various aspects of the present disclosure. The operations described with regard to FIG. 7A may be performed by a wireless communication device, such as a UE 145, 250, an eNB 110, 210, 230, and/or any other device capable of performing odd exponent QAM. For example, the wireless communication device may be a transmitter device encoding a bit stream using OE-QAM.

As shown in FIG. 7A, and by reference number 705, the wireless communication device may receive information bits. For example, the information bits may include or be included in a bit stream to be modulated using OE-QAM.

As shown by reference number 710, the wireless communication device may group the bits into groups of 2n−1 bits. For example, the groups of 2n−1 bits may include an odd number of bits, such as 3 bits, 5 bits, 7 bits, and so on. The wireless communication device may group the bits into groups of 2n−1 bits so that a parity bit can be added to each group as a 2nth bit, thus enabling OE-QAM, as described in more detail below.

As shown by reference number 715, the wireless communication device may add a parity bit as a 2nth bit. A parity bit is a bit that acts as a check on a set of binary values, calculated in such a way that the number of is in the set, including the parity bit, should be equal to a particular value (e.g., should always be odd, or should always be even). The parity bit is used so that, when the groups and corresponding parity bits are mapped to a constellation associated with an exponent of 2n, a corresponding odd-exponent constellation with an exponent of 2n−1 is generated, as described in more detail below. The parity bit can include at least one of an odd parity bit or an even parity bit.

In some aspects, the parity bit may be any bit of the group of bits. For example, where a group of bits includes 2n bits, the parity bit may be any bit from the first bit to the 2nth bit. Additionally, or alternatively, a group of bits may include multiple, different parity bits. For example, a group of bits may include an odd number of parity bits (e.g., 3 parity bits, 5 parity bits, and/or the like) or an even number of parity bits (e.g., 2 parity bits, 4 parity bits, and/or the like).

As shown by reference number 720, the wireless communication device may map the groups of bits to a modulation constellation associated with a $2^{2n}$ modulation order. In other words, the wireless communication device may map the groups of bits to an even-exponent modulation constellation. As shown by reference number 725, by mapping the groups of bits and the corresponding parity bit(s) to the even-exponent modulation constellation, the wireless communication device may generate mapped constellation samples associated with an odd-exponent modulation constellation. For example, the mapping of the groups of bits with the corresponding parity bits may cause a subset of constellation points to be skipped in the modulation process. As a more particular example, for the case with a single parity bit per group of bits, every other constellation point may be skipped, as described in more detail in connection with FIG. 7B, below. Thus, an odd-exponent modulation constellation is generated by mapping groups of bits and corresponding parity bit(s) to an even-exponent modulation constellation. This odd-exponent modulation constellation can be used in the gaps (in space and/or wireless communication performance) between even-exponent modulation orders, as described in more detail in connection with FIGS. 8 and 9, which improves throughput and coverage of the wireless communication device. Furthermore, the technique described with regard to FIG. 7A may be less computationally expensive and more easily scalable than other techniques for generating odd-exponent modulation constellations, such as techniques for generating circular modulation constellations and other techniques.

FIG. 7B shows an example of an even-exponent QAM constellation and an odd-exponent QAM constellation generated using the process described in connection with FIG. 7A, above. As shown by reference number 730, the even-exponent QAM constellation may be a 64-QAM constellation corresponding to an exponent of $2^6$. As shown by reference number 735, the odd-exponent QAM constellation may be a 32-QAM constellation corresponding to an exponent of $2^5$. The 32-QAM constellation may be generated by mapping groups of five bits and corresponding parity bits to the 64-QAM constellation. As can be seen, the usage of the parity bits may cause every other constellation point to be skipped. Thus, the 32-QAM constellation is generated without high-complexity hardware implementation and costly reshaping of the 64-QAM constellation.

Furthermore, the generation of the 32-QAM constellation may increase the minimum distance between constellation points of the 64-QAM constellation. For example, assume that a minimum distance between dots of the 64-QAM constellation (shown by reference number 740) is equal to x. In such a case, and when a single parity bit is included in each group of bits, the minimum distance between dots of the 32-QAM constellation (shown by reference number 745) may be equal to x times the square root of 2. Thus, demodulation of signals mapped to the 32-QAM constellation may be less error-prone than signals mapped to the 64-QAM constellation. In some aspects, when an odd number of parity bits greater than one are used (e.g., 3 parity bits, 5 parity bits, and/or the like), a minimum distance between the constellation points of the odd-exponent modulation constellation may be greater (e.g., x times the square root of 8). Therefore, the odd-exponent modulation constellation may be relatively easier to demodulate than the even-exponent modulation constellation at a particular SNR, thereby improving wireless communication performance.

In some aspects, the odd-exponent modulation constellation may retain a symmetrical property of the even-exponent modulation constellation, which may be Gray-mapped. In particular, when Gray mapping is employed to generate the even-exponent constellation and any of the 2n bits is the parity bit, then the resulting odd-exponent constellation may inherit the following property: every other point may be skipped and subsequently, a minimum distance between any two points in the odd-exponent constellation may be equal to the square root of two times the minimum distance between any two points in the even-exponent constellation. For example, in this case, the odd-exponent modulation constellation retains symmetry on the 45-degree and 135-degree axes relative to a horizontal axis of the constellation. This may simplify design of the modulator or demodulator and improve power utilization relative to an asymmetrical constellation.

In some aspects, an average transmit power of the odd-exponent modulation constellation may be similar to, or the same as, the next-higher even-exponent modulation constellation. Thus, power amplifier specification may not need to be changed for the technique described with regard to FIG. 7A. Additionally, or alternatively, transmit error vector magnitude (Tx-EVM) requirements, associated with the technique described herein, can possibly be relaxed (e.g., by approximately 3 decibels). This may lead to less stringent requirements on analog front-ends and RF front-ends of transmitting and/or receiving devices, thereby increasing the maximum modulation order supported by those devices. Additionally, or alternatively, the technique described herein can be demodulated with low complexity hardware in comparison to a more complex constellation or hardware that is configured to ignore particular constellation points.

As indicated above, FIGS. 7A and 7B are provided as examples. Other examples are possible and may differ from what was described with respect to FIGS. 7A and 7B.

Figure 8:
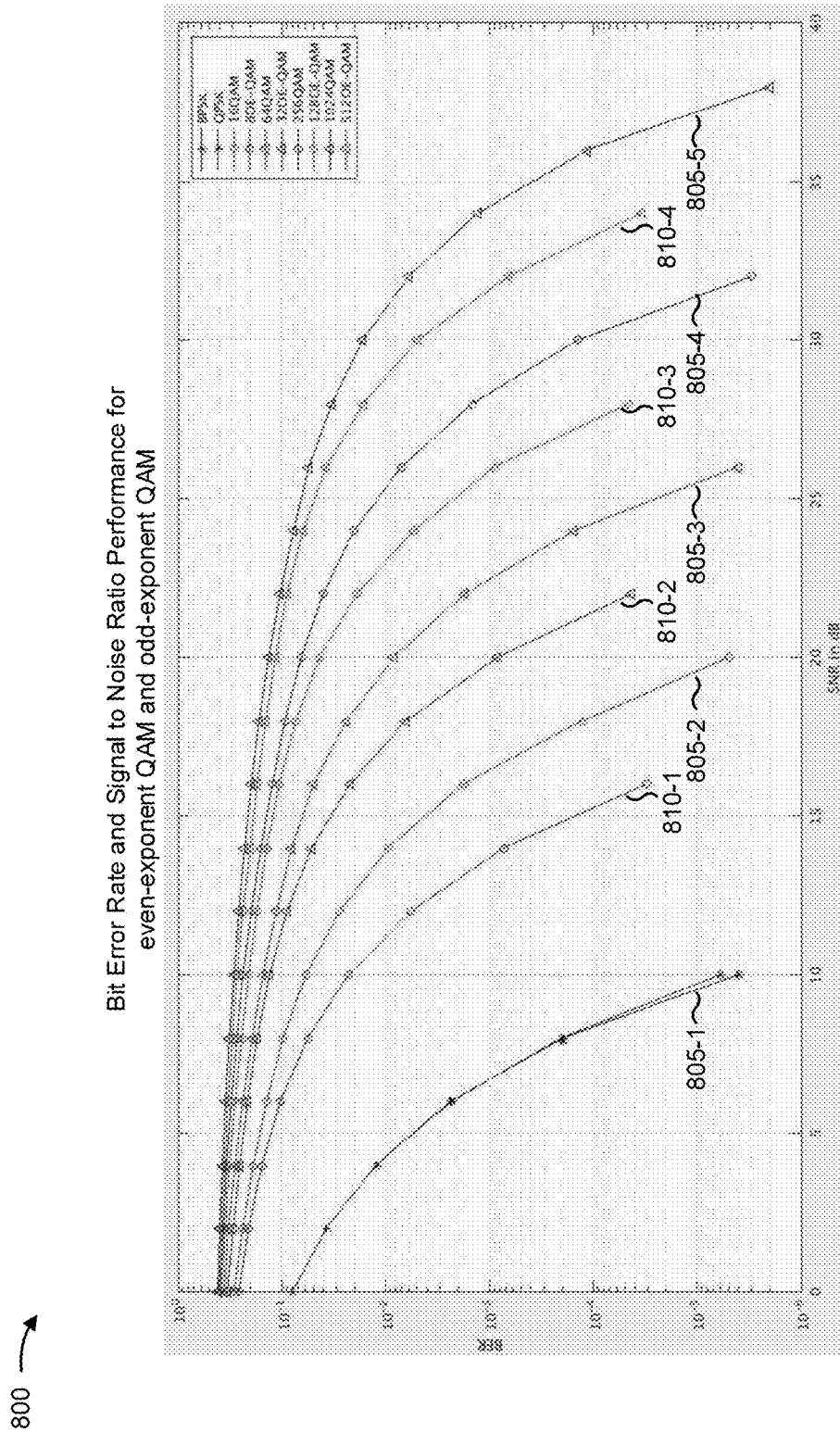
FIG. 8 is a diagram illustrating an example of bit error rate and signal to noise ratio performance for even-exponent QAM and odd-exponent QAM, in accordance with various aspects of the present disclosure.

FIG. 8 is a diagram illustrating an example 800 of bit error rate (BER) and signal to noise ratio (SNR) performance for even-exponent QAM and odd-exponent QAM, in accordance with various aspects of the present disclosure.

As can be seen in FIG. 8, generally speaking, as SNR improves, a BER of the modulation schemes decreases. Even-exponent QAM BER performance is plotted using the lines identified by reference numbers 805-1 through 805-5. For example, reference number 805-1 shows a QPSK scheme, reference number 805-2 shows a 16-QAM scheme, reference number 805-3 shows a 64-QAM scheme, reference number 805-4 shows a 256-QAM scheme, and reference number 805-5 shows a 1024-QAM scheme.

As can also be seen, there is a gap between each even-order QAM line. For example, when the SNR is equal to 20 decibels, the wireless communication device may be forced to use 64-QAM at a relatively poor performance level (e.g., approximately $10^{-2}$ BER), since 16-QAM would not provide sufficient throughput to be used on a large scale, despite a lower error rate.

The odd-exponent QAM schemes, shown by reference numbers 810-1 through 810-4, are situated in between the corresponding even-exponent QAM schemes, which helps to bridge the gap between each even-exponent QAM scheme. For example, reference number 810-1 shows an 8-QAM scheme (generated using the modulation constellation associated with the 16-QAM scheme), reference number 810-2 shows a 32-QAM scheme (generated using the modulation constellation associated with the 64-QAM scheme), reference number 810-3 shows an 128-QAM scheme (generated using the modulation constellation associated with the 256-QAM scheme), reference number 810-4 shows an 512-QAM scheme (generated using the modulation constellation associated with the 1024-QAM scheme).

As an example, at the above-mentioned SNR of 20 decibels, the wireless communication device may fall back to the 32-QAM scheme, which provides an improved BER of approximately $10^{-3}$. Thus, the technique described in connection with FIG. 7A provides an improvement for modulation performance at particular SNRs, and thus improves uniformity of wireless communication performance of the wireless communication device.

As indicated above, FIG. 8 is provided as an example. Other examples are possible and may differ from what was described with respect to FIG. 8.

Figure 9:
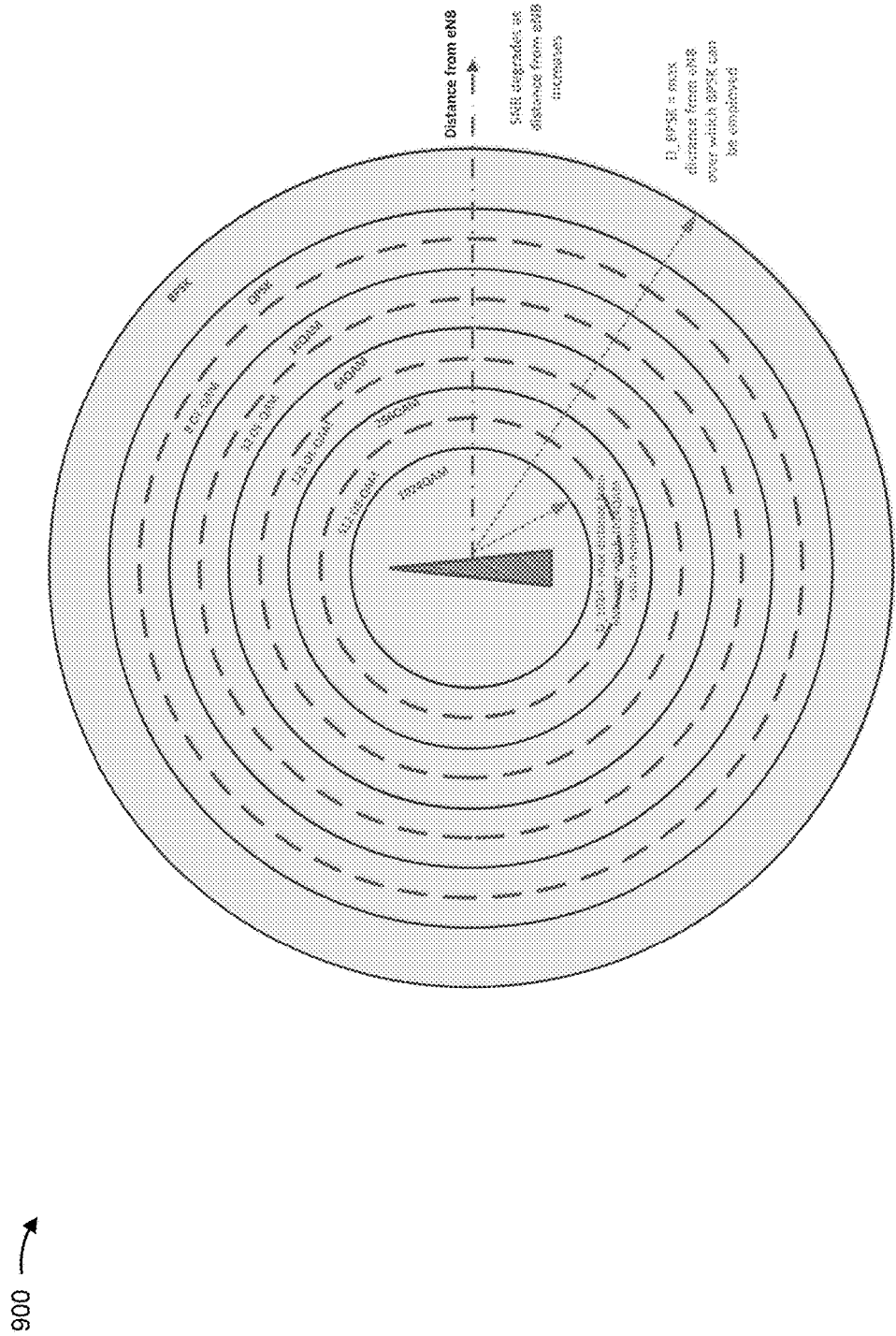
FIG. 9 is a diagram illustrating an example of coverage ranges of even-exponent QAM and odd-exponent QAM, in accordance with various aspects of the present disclosure.

FIG. 9 is a diagram illustrating an example 900 of coverage ranges of even-exponent QAM and OE-QAM, in accordance with various aspects of the present disclosure. FIG. 9 is described with reference to an eNB 110, 210, 230 that encodes a communication using one of the aforementioned QAM approaches, and a UE 145, 250 that moves closer to or farther away from the eNB 110, 210, 230.

As the UE 145, 250 moves farther from the eNB 110, 210, 230, SNR of wireless communications between the UE 145, 250 and the eNB 110, 210, 230 may degrade due to path loss and Doppler effects, so the eNB 110, 210, 230 may fall back to increasingly more robust modulation schemes. For example, coverage areas of various even-order modulation schemes are bounded by solid lines, shown as circles for ease of exposition. When the odd-exponent QAM techniques described herein are not used, there may be a relatively large gap between the radius associated with a higher even-order QAM scheme and a lower even-order QAM scheme. Thus, a UE 145, 250 in between two of the circles shown in FIG. 9 may experience degraded performance as the UE 145, 250 moves radially outward and before the UE 145, 250 reaches a next circle. Furthermore, the UE 145, 250 may be forced to use a significantly low data rate, more robust even-exponent QAM scheme for a relatively large range of radii (e.g., between two of the solid circles).

Example coverage areas using odd-exponent QAM schemes, as can be generated using the technique described in connection with FIG. 7A, are shown by the dashed lines between the solid lines. Thus, a UE 145, 250 situated in between two of the solid circles may fall back to an odd-exponent QAM scheme, which has higher data rate than the next-lower even-exponent QAM scheme and, therefore, may provide improved performance. In this way, capacity of the eNB 110, 210, 230 may be improved by more granular selection of QAM schemes from odd-exponent QAM schemes and even-exponent QAM schemes.

As possible examples of capacity improvement using the techniques and apparatuses described herein, when the wireless communication device falls back from 16-QAM to 8-QAM, instead of to QPSK, spectral efficiency may be improved by approximately 50 percent relative to falling back to QPSK. When the wireless communication device falls back from 64-QAM to 32-QAM, instead of to 16-QAM, spectral efficiency may be improved by approximately 25 percent relative to falling back to 16-QAM. When the wireless communication device falls back from 256-QAM to 128-QAM, instead of to 64-QAM, spectral efficiency may be improved by approximately 16.67 percent relative to falling back to 64-QAM. When the wireless communication device falls back from 1024-QAM to 512-QAM, instead of to 256-QAM, spectral efficiency may be improved by approximately 12.5 percent relative to falling back to 256-QAM.

As indicated above, FIG. 9 is provided as an example. Other examples are possible and may differ from what was described with respect to FIG. 9.

Figure 10:
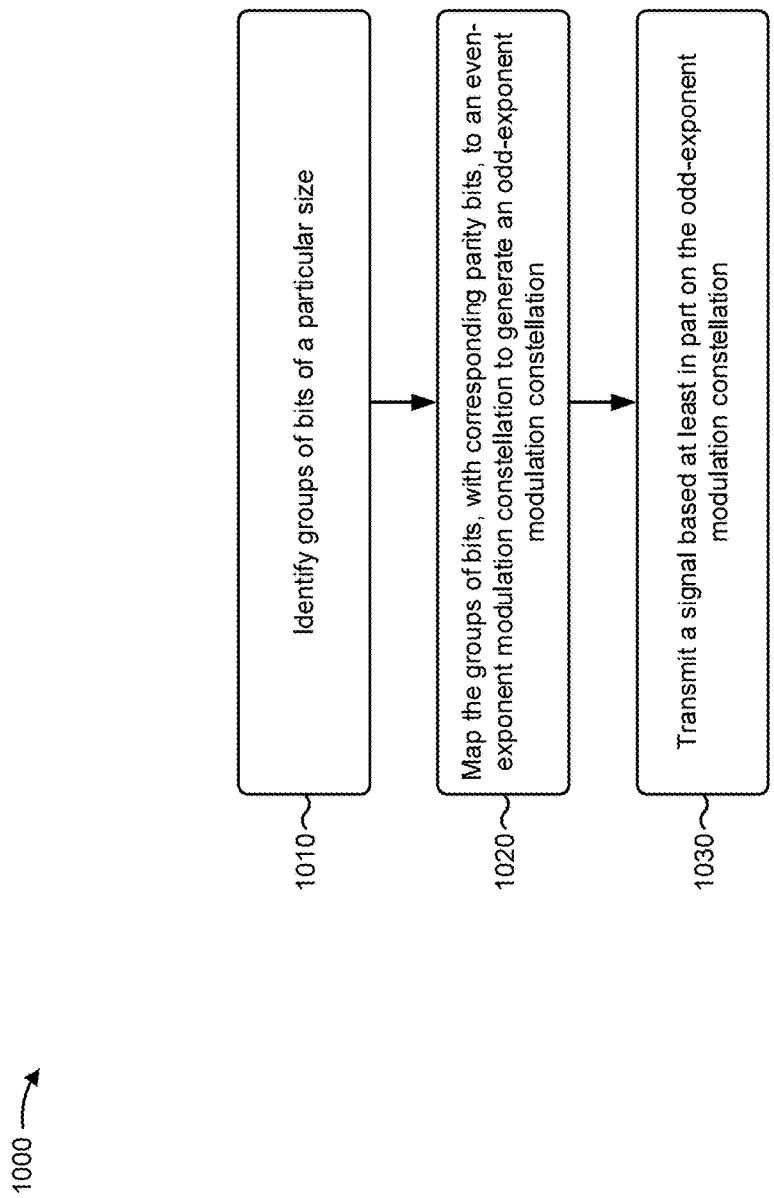
FIG. 10 is a diagram illustrating an example process performed, for example, by a wireless communication device, in accordance with various aspects of the present disclosure.

FIG. 10 is a diagram illustrating an example process 1000 performed, for example, by a wireless communication device, in accordance with various aspects of the present disclosure. Example process 1000 is an example where a wireless communication device (e.g., the eNB 110, 210, 230, the UE 145, 250, or another device capable of encoding signals using OE-QAM) performs OE-QAM.

As shown in FIG. 10, in some aspects, process 1000 may include identifying groups of bits of a particular size (block 1010). For example, the wireless communication device may identify groups of bits of a particular size. In some aspects, the groups of bits may include 2n−1 bits. For example, the wireless communication device may identify the groups of bits for generation of an odd-exponent modulation constellation with an order of $2^{2n-1}$, by mapping the groups of bits with corresponding parity bit(s) to an even-exponent modulation constellation with an order of $2^{2n}$.

As shown in FIG. 10, in some aspects, process 1000 may include mapping the groups of bits, with corresponding parity bits, to an even-exponent modulation constellation to generate an odd-exponent modulation constellation (block 1020). For example, at least one corresponding parity bit may be added to each group of bits. Each group of bits, in association with the corresponding parity bits, may be mapped to an even-exponent modulation constellation. The inclusion of the corresponding parity bits in the groups of bits may lead to the generation of an odd-exponent modulation constellation of a next-lower order from the even-exponent modulation constellation, and the odd-exponent modulation constellation may have a larger minimum distance between constellation points than the even-exponent modulation constellation. Therefore, the odd-exponent modulation constellation may be relatively easier to demodulate than the even-exponent modulation constellation at a particular SNR, thereby improving wireless communication performance.

As shown in FIG. 10, in some aspects, process 1000 may include transmitting a signal based at least in part on the odd-exponent modulation constellation (block 1030). For example, the wireless communication device may transmit a signal based at least in part on the odd-exponent modulation constellation. The signal may include symbols corresponding to the groups of bits that were mapped in connection with block 1020, above. A receiving device may attempt to demodulate the signal. In some aspects, the receiving device may receive the signal, and may rotate the signal 45 degrees. This may make the signal easier to demodulate, since the constellation points, which were previously symmetrical on the 45 and 135 degree axes of the I-Q plot, are made to be symmetrical on the 0 and 90 degree axes of the I-Q plot. Thus, demodulation performance may be improved.

In some aspects, the particular size is 2n−1 bits and the corresponding parity bits are associated with the groups of bits as a 2nth bit. In some aspects, the odd-exponent modulation constellation has a 2n-lth order. In some aspects, a subset of constellation points of the even-exponent modulation constellation is skipped in the odd-exponent modulation constellation based at least in part on the corresponding parity bits.

In some aspects, every other constellation point of the even-exponent modulation constellation is skipped in the odd-exponent modulation constellation based at least in part on the corresponding parity bits. In some aspects, the odd-exponent modulation constellation is associated with a larger minimum distance between constellation points than the even-exponent modulation constellation based at least in part on the groups of bits being mapped with the corresponding parity bits. In some aspects, the corresponding parity bits include one parity bit per group of bits of the groups of bits, a minimum distance between constellation points of the even-exponent modulation constellation is equal to x, and a minimum distance between constellation points of the odd-exponent modulation constellation is equal to x multiplied by a square root of 2.

In some aspects, the odd-exponent modulation constellation retains a symmetric property of the even-exponent modulation constellation. In some aspects, the symmetric property corresponds to an axis of symmetry at a 45 degree angle or a 135 degree angle with regard to an in-phase axis of the odd-exponent modulation constellation. In some aspects, the odd-exponent modulation constellation has a constellation power-normalization factor equal to a constellation power-normalization factor of the even-exponent modulation constellation.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
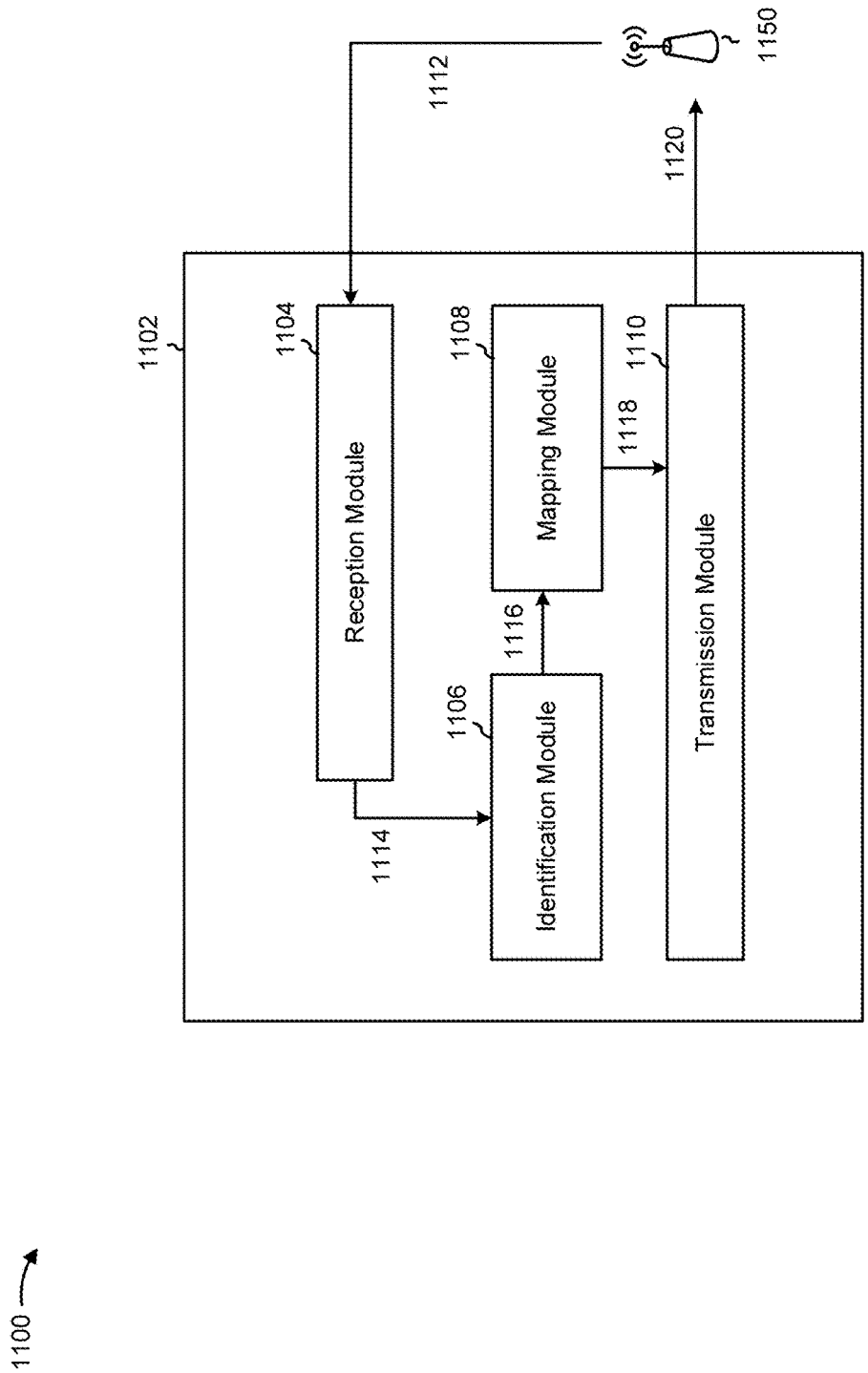
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a wireless communication device (e.g., the eNB 110, 210, 230, the UE 145, 250, and/or the like). In some aspects, the apparatus 1102 includes a reception module 1104, an identification module 1106, a mapping module 1108, and/or a transmission module 1110.

The reception module 1104 may receive signals 1112. In some aspects, the reception module 1104 may receive the signals 1112 from another device (e.g., a device 1150). In some aspects, the signals 1112 may include a bit stream and/or one or more groups of bits to be modulated. In some aspects, the signals 1112 may be received from the apparatus 1102 (e.g., from a different protocol stack layer of the apparatus 1102, etc.). The reception module may provide the signals 1112 to the identification module 1106 as data 1114. In some aspects, the data 1114 may include groups of bits.

The identification module 1106 may identify groups of bits of a particular size from the data 1114. The identification module 1106 may provide the groups of bits of the particular size to the mapping module 1108 as data 1116. In some aspects, the identification module 1106 and/or the mapping module 1108 may be part of a modulation or signaling module of the apparatus 1102, such as a component or module of a communication chain and/or the like.

The mapping module 1108 may map the groups of bits, with corresponding parity bits, to an even-exponent modulation constellation to generate an odd-exponent modulation constellation. The mapping module 1108 may provide the odd-exponent modulation constellation and/or a signal generated based at least in part on mapping the groups of bits to the transmission module 1110 as data 1118. The transmission module 1110 may transmit a signal 1120 based at least in part on the odd-exponent modulation constellation.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
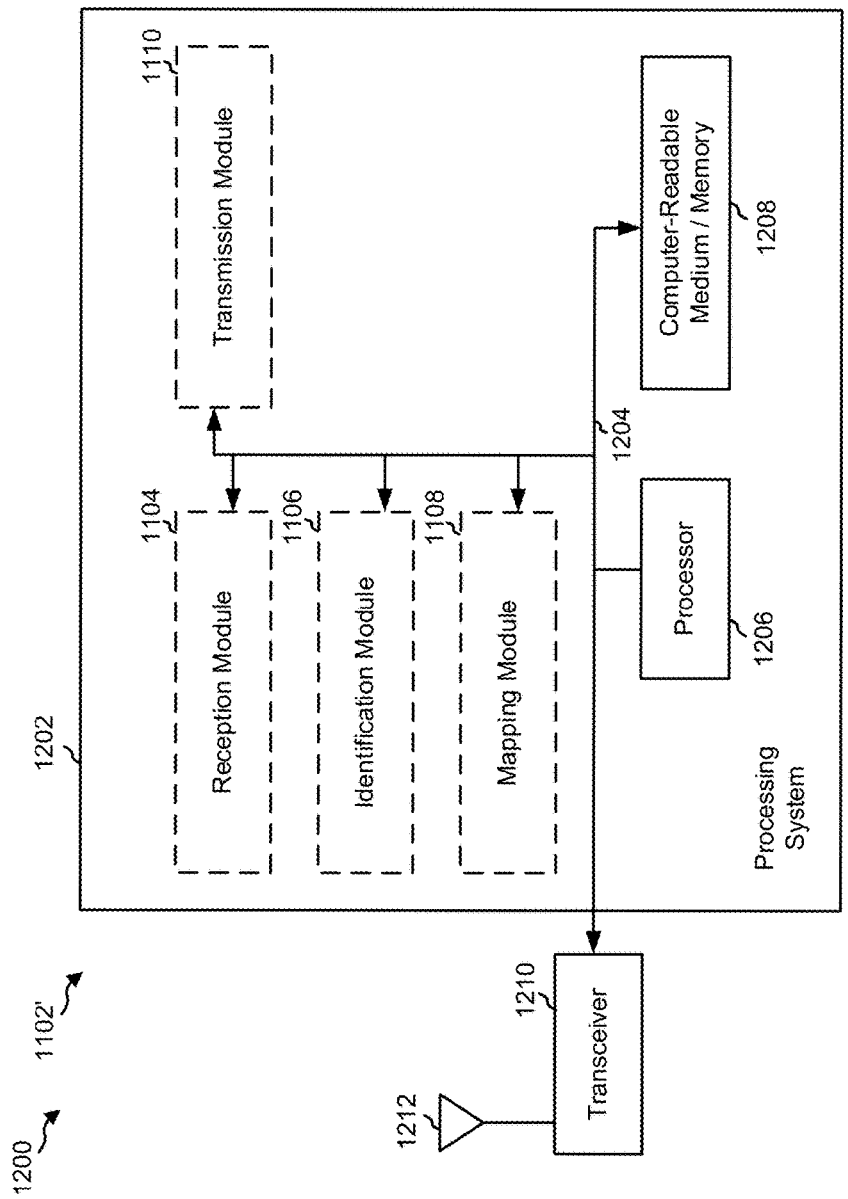
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a wireless communication device (e.g., the eNB 110, 210, 230, the UE 145, 250, and/or the like).

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, 1110, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1110, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, 1108, and 1110. The modules may be software modules running in the processor 1206, resident/stored in the computer readable medium/memory 1208, one or more hardware modules coupled to the processor 1206, or some combination thereof. In some aspects, the processing system 1202 may be a component of the eNB 110, 210, 230 and may include the memory 635 and/or at least one of the TX processor 610, the RX processor 630, and/or the controller/processor 605. Additionally, or alternatively, the processing system 1202 may be a component of the UE 145, 250 and may include the memory 665 and/or at least one of the TX processor 680, the RX processor 650, and/or the controller/processor 660.

In some aspects, the apparatus 1102/1102' for wireless communication includes means for identifying groups of bits of a particular size; means for mapping the groups of bits, with corresponding parity bits, to an even-exponent modulation constellation to generate an odd-exponent modulation constellation; and means for transmitting a signal based at least in part on the odd-exponent modulation constellation. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX processor 610, the RX processor 630, the controller/processor 605, the TX processor 680, the RX processor 650, and/or the controller/processor 660. As such, in one configuration, the aforementioned means may be the TX processor 610, the RX processor 630, the controller/processor 605, the TX processor 680, the RX processor 650, and/or the controller/processor 660 configured to perform the functions recited by the aforementioned means.

FIG. 12 is provided as an example. Other examples are possible and may differ from what was described in connection with FIG. 12.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   identifying groups of bits of a particular size;
   mapping the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and
   transmitting a signal based at least in part on the odd-exponent modulation constellation.

2. The method of claim 1,
   wherein the particular size is 2n−1 bits and the corresponding parity bits are associated with the groups of bits as a 2nth bit, and
   wherein n is greater than 0.

3. The method of claim 2, wherein the odd-exponent modulation constellation has a 2n-1th order.

4. The method of claim 1, wherein a subset of constellation points of the even-exponent modulation constellation is skipped in the odd-exponent modulation constellation based at least in part on the corresponding parity bits.

5. The method of claim 1, wherein every other constellation point of the even-exponent modulation constellation is skipped in the odd-exponent modulation constellation based at least in part on the corresponding parity bits.

6. The method of claim 1, wherein the odd-exponent modulation constellation is associated with a larger minimum distance between constellation points than the even-exponent modulation constellation based at least in part on the groups of bits being mapped with the corresponding parity bits.

7. The method of claim 6,
   wherein the corresponding parity bits include one parity bit per group of bits of the groups of bits;
   wherein a minimum distance between constellation points of the even-exponent modulation constellation is equal to x;
   wherein a minimum distance between constellation points of the odd-exponent modulation constellation is equal to x multiplied by a square root of 2; and
   wherein x is equal to or greater than 0.

8. The method of claim 1, wherein the odd-exponent modulation constellation retains a symmetric property of the even-exponent modulation constellation.

9. The method of claim 8, wherein the symmetric property corresponds to an axis of symmetry at a 45 degree angle or a 135 degree angle with regard to an in-phase axis of the odd-exponent modulation constellation.

10. The method of claim 1, wherein the odd-exponent modulation constellation has a constellation power-normalization factor equal to a constellation power-normalization factor of the even-exponent modulation constellation.

11. A wireless communication device, comprising:
    a memory; and
    at least one processor operatively coupled to the memory, the at least one processor configured to:
    identify groups of bits of a particular size;

map the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and transmit a signal based at least in part on the odd-exponent modulation constellation.

12. The wireless communication device of claim 11, wherein the particular size is 2n−1 bits and the corresponding parity bits are associated with the groups of bits as a 2nth bit, and wherein n is greater than 0.

13. The wireless communication device of claim 12, wherein the odd-exponent modulation constellation has a 2n-lth order.

14. The wireless communication device of claim 11, wherein a subset of constellation points of the even-exponent modulation constellation is skipped in the odd-exponent modulation constellation based at least in part on the corresponding parity bits.

15. The wireless communication device of claim 11, wherein every other constellation point of the even-exponent modulation constellation is skipped in the odd-exponent modulation constellation based at least in part on the corresponding parity bits.

16. The wireless communication device of claim 11, wherein the odd-exponent modulation constellation is associated with a larger minimum distance between constellation points than the even-exponent modulation constellation based at least in part on the groups of bits being mapped with the corresponding parity bits.

17. The wireless communication device of claim 16, wherein the corresponding parity bits include one parity bit per group of bits of the groups of bits;

wherein a minimum distance between constellation points of the even-exponent modulation constellation is equal to x;

wherein a minimum distance between constellation points of the odd-exponent modulation constellation is equal to x multiplied by a square root of 2; and wherein x is equal to or greater than 0.

18. The wireless communication device of claim 11, wherein the odd-exponent modulation constellation retains a symmetric property of the even-exponent modulation constellation.

19. A non-transitory computer-readable medium storing computer executable code for wireless communication, comprising code for:

identifying groups of bits of a particular size;

mapping the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and transmitting a signal based at least in part on the odd-exponent modulation constellation.

20. The non-transitory computer-readable medium of claim 19, wherein the particular size is 2n−1 bits and the corresponding parity bits are associated with the groups of bits as a 2nth bit, and wherein n is greater than 0.

21. The non-transitory computer-readable medium of claim 20, wherein the odd-exponent modulation constellation has a 2n-lth order.

22. The non-transitory computer-readable medium of claim 19, wherein a subset of constellation points of the even-exponent modulation constellation is skipped in the odd-exponent modulation constellation based at least in part on the corresponding parity bits.

23. The non-transitory computer-readable medium of claim 19, wherein the odd-exponent modulation constellation is associated with a larger minimum distance between constellation points than the even-exponent modulation constellation based at least in part on the groups of bits being mapped with the corresponding parity bits.

24. The non-transitory computer-readable medium of claim 19, wherein the odd-exponent modulation constellation retains a symmetric property of the even-exponent modulation constellation.

25. An apparatus, comprising:

means for identifying groups of bits of a particular size;

means for mapping the groups of bits, with corresponding parity bits, to an even-exponent modulation constellation to generate an odd-exponent modulation constellation, wherein at least one corresponding parity bit, of the corresponding parity bits, is added to a group of bits, of the groups of bits, for the mapping; and means for transmitting a signal based at least in part on the odd-exponent modulation constellation.

26. The apparatus of claim 25, wherein the particular size is 2n−1 bits and the corresponding parity bits are associated with the groups of bits as a 2nth bit, and wherein n is greater than 0.

27. The apparatus of claim 26, wherein the odd-exponent modulation constellation has a 2n-lth order.

28. The apparatus of claim 25, wherein a subset of constellation points of the even-exponent modulation constellation is skipped in the odd-exponent modulation constellation based at least in part on the corresponding parity bits.

29. The apparatus of claim 25, wherein the odd-exponent modulation constellation is associated with a larger minimum distance between constellation points than the even-exponent modulation constellation based at least in part on the groups of bits being mapped with the corresponding parity bits.

30. The apparatus of claim 25, wherein the odd-exponent modulation constellation retains a symmetric property of the even-exponent modulation constellation.

* * * * *